H. D. CRAWFORD.
NUT CRACKING MACHINE.
APPLICATION FILED MAY 4, 1916.
1,230,679.
Patented June 19, 1917.
5 SHEETS—SHEET 1.
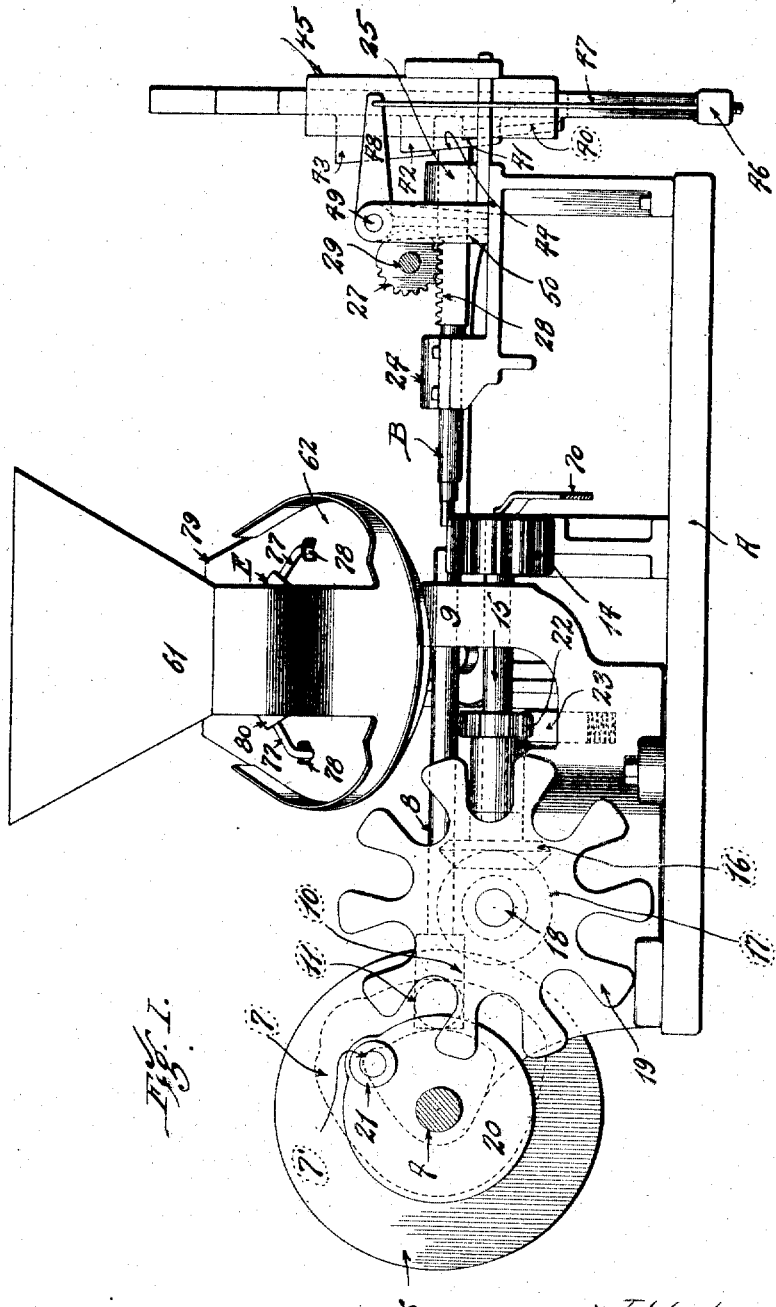
INVENTOR
H. D. Crawford
By Knight & Cook attys H. D. CRAWFORD.
NUT CRACKING MACHINE.
APPLICATION FILED MAY 4, 1916.
1,230,679.
Patented June 19, 1917.
5 SHEETS—SHEET 2.
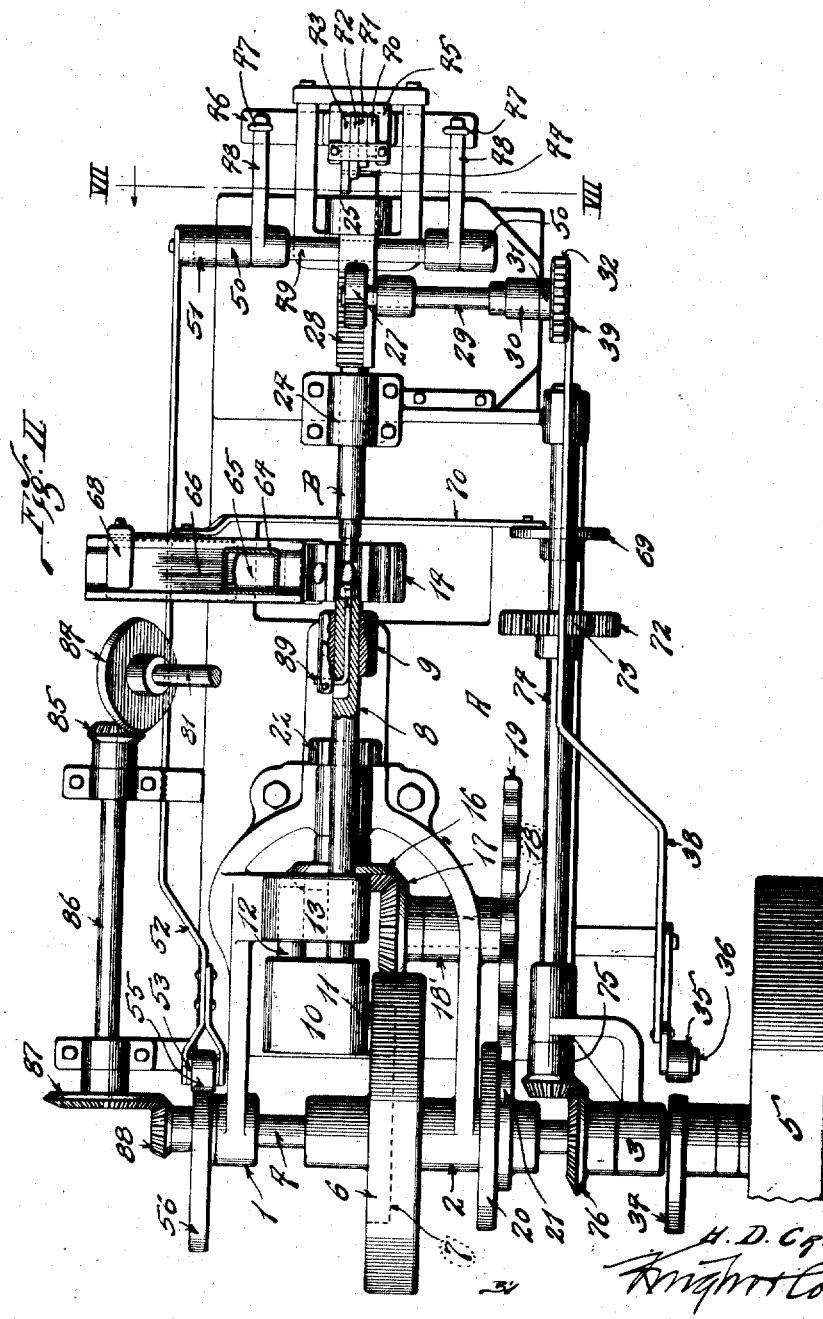

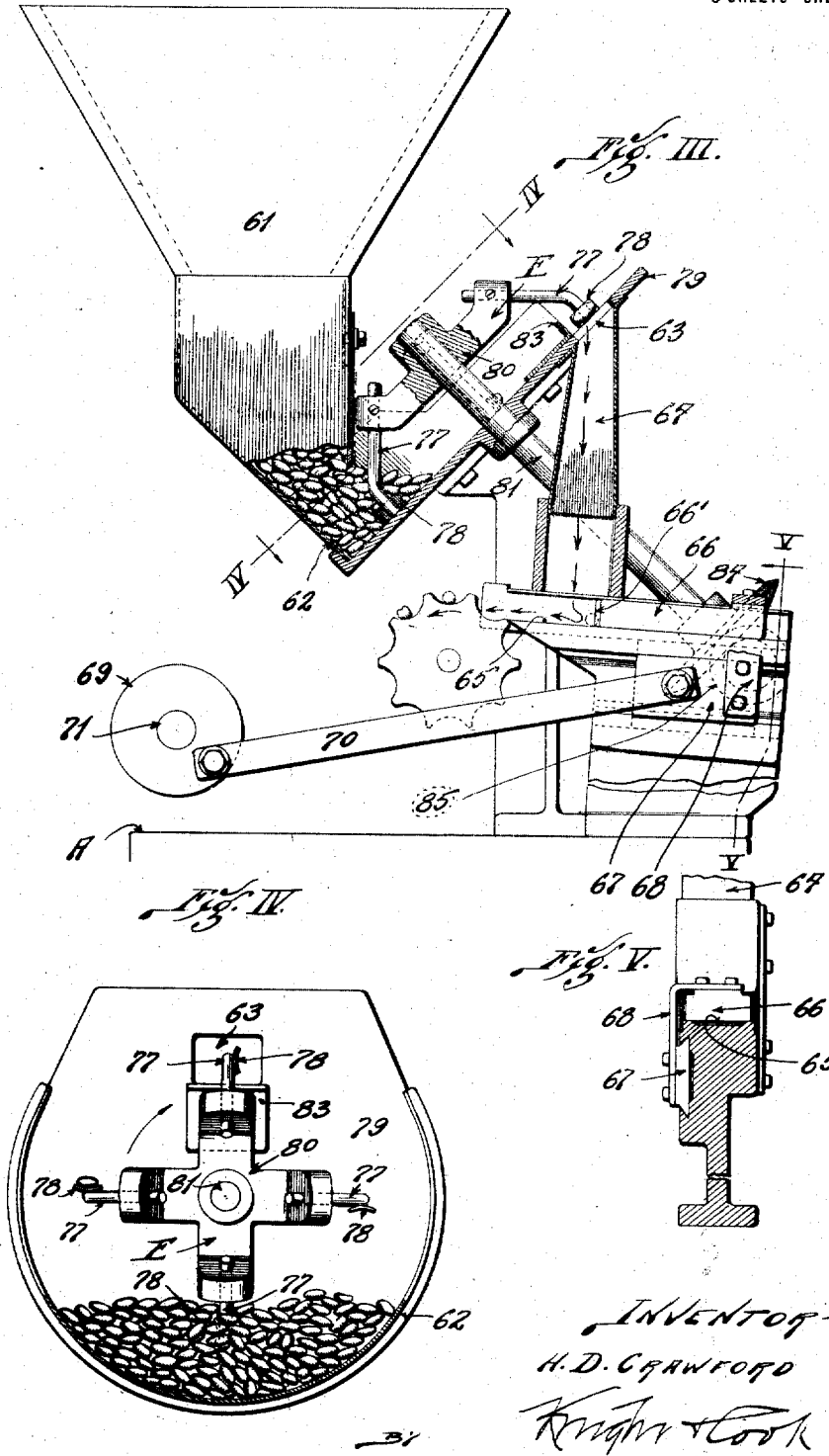

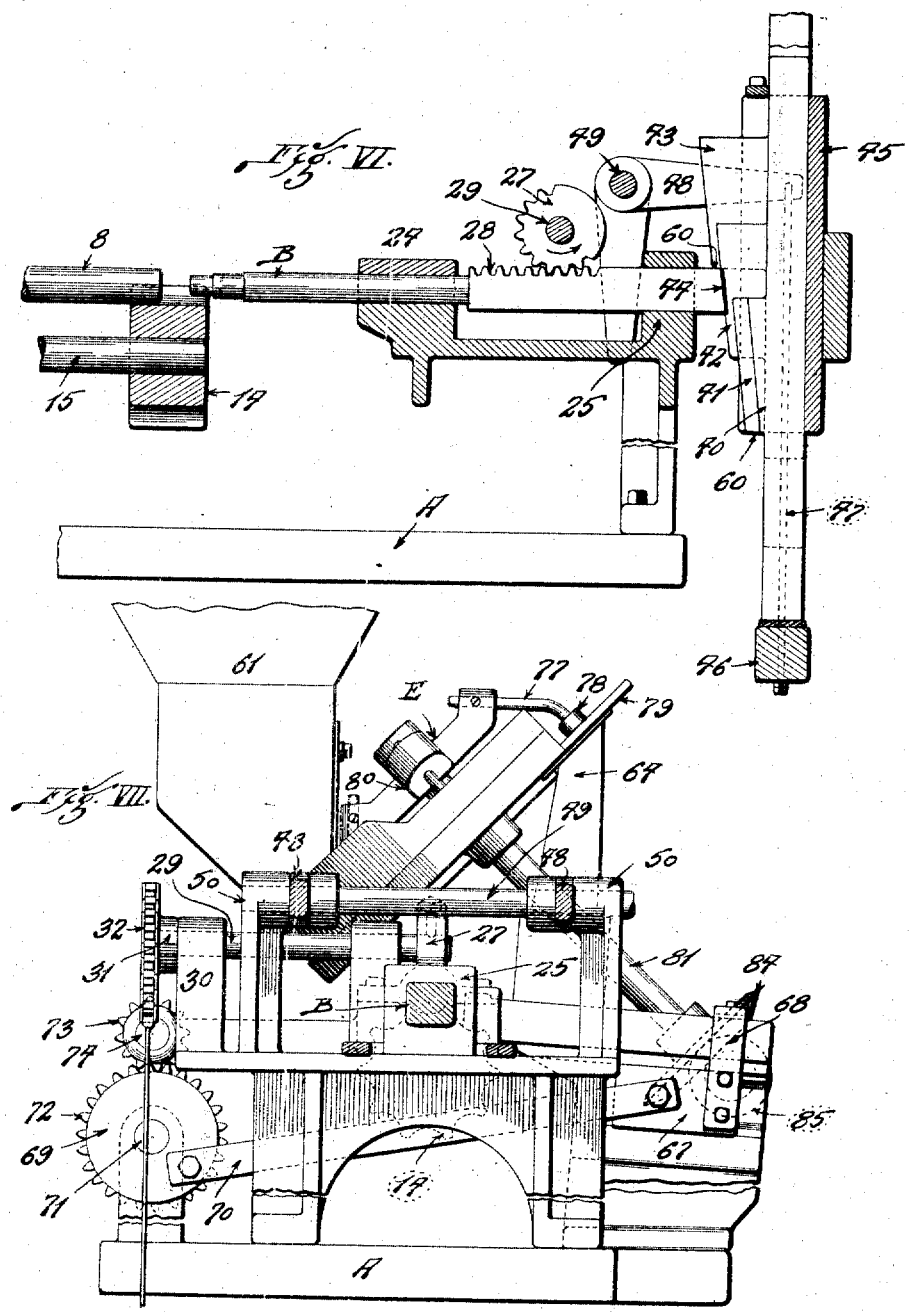

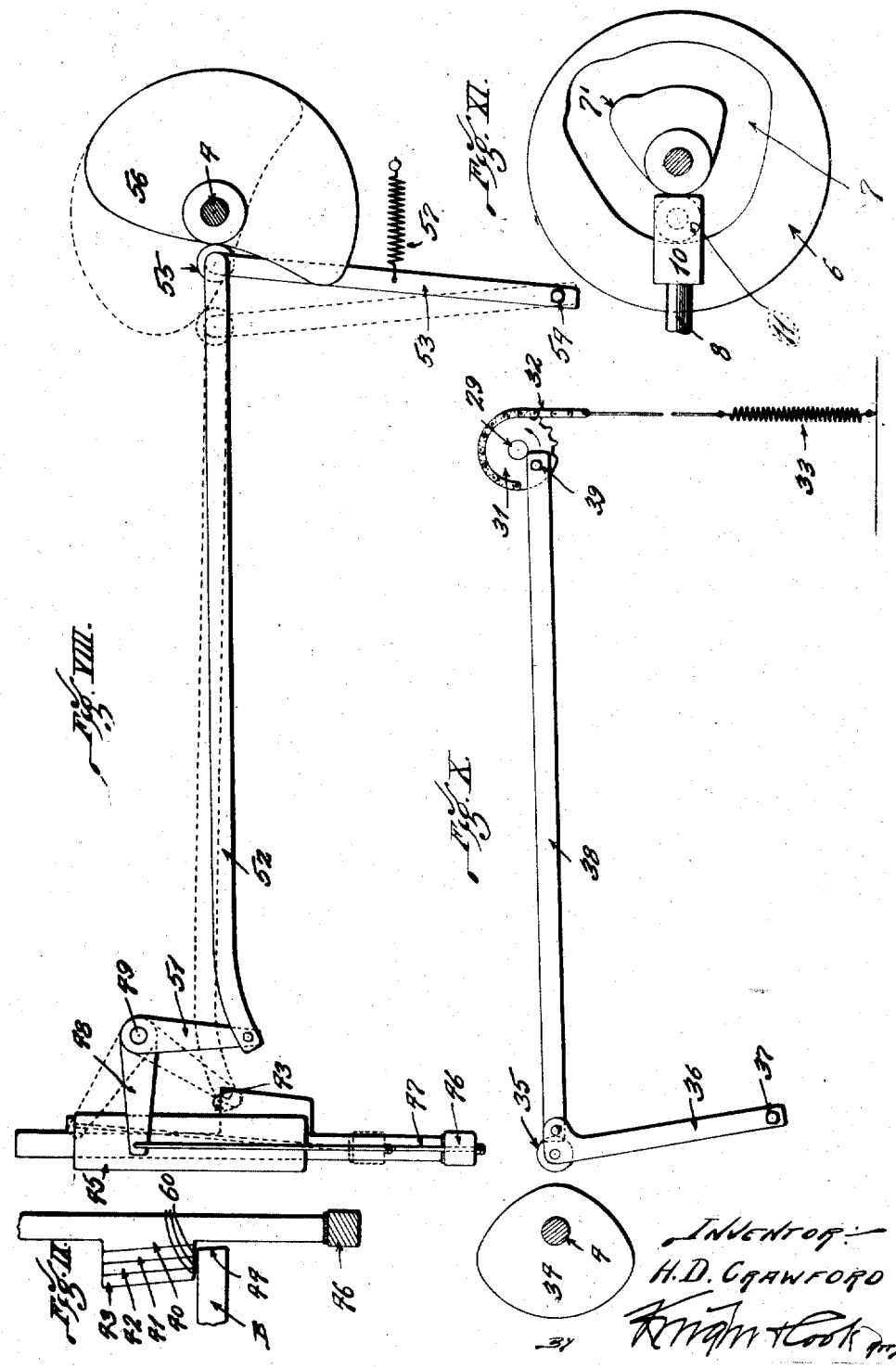

UNITED STATES PATENT OFFICE.

HENRY D. CRAWFORD, OF ST. LOUIS, MISSOURI, ASSIGNOR TO R. E. FUNSTEN DRIED FRUIT & NUT COMPANY, A CORPORATION OF MISSOURI.

NUT-CRACKING MACHINE.

1,230,679.     Specification of Letters Patent.     Patented June 19, 1917.

Application filed May 4, 1916. Serial No. 95,349.

*To all whom it may concern:*

Be it known that I, HENRY D. CRAWFORD, a citizen of the United States of America, a resident of the city of St. Louis, State of Missouri, have invented certain new and useful Improvements in Nut-Cracking Machines, of which the following is a full, clear, and exact description, reference being had to the accompanying drawings, forming a part of this specification.

My invention relates to improvements in nut cracking machines, one of the objects being to produce a simple and absolutely reliable compensating device associated with the cracking elements of a nut cracking machine to compensate for variations in the lengths of the nuts to be cracked. With this object in view the preferred form of the invention includes a plurality of selective compensating elements movable independently of each other so that any one of them may be selected and automatically located in an operative position. More specifically stated, these compensating elements preferably consist of a plurality of wedges, differing from each other, and adapted to move successively from a normal or starting position until one of them reaches an operative position. When the selected wedge has been stopped in its operative position the nut to be cracked is held between the cracking members and a predetermined degree of movement is then imparted to one of the cracking members.

Another object is to produce a simple and efficient means for feeding the nuts one at a time from a receptacle to the cracking device.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a side elevation, partly in section, illustrating a nut cracking machine constructed in accordance with the invention.

Fig. II is a top or plan view, partly in section.

Fig. III is a transverse section showing the means for feeding the nuts, one at a time, from a receptacle to the cracking members.

Fig. IV is a section on line IV—IV, Fig. III.

Fig. V is a vertical section on line V—V, Fig. III.

Fig. VI is a fragmentary vertical section showing the compensating device and the cracking members associated therewith.

Fig. VII is a vertical section taken approximately on the line VII—VII, Fig. II.

Fig. VIII is a detail view showing the compensating elements and the means for restoring said elements to their normal or starting positions.

Fig. IX is a detail view showing the compensating elements in their normal or starting positions, also showing a portion of the cracking member which lies adjacent to the compensating elements.

Fig. X is a detail view of the cam-controlled device for actuating one of the cracking members.

Fig. XI is a detail view of the cam whereby a predetermined degree of movement is imparted to one of the cracking members after said members have been adjusted to their operative positions.

A designates the bed of the machine upon the rear portion of which is mounted a frame provided with bearings 1, 2 and 3 for a main drive shaft 4. This drive shaft is provided with a power wheel 5 and it may be driven constantly by any suitable power mechanism. 6 designates a cam wheel (Figs. I, II and XI) provided at one of its sides with a cam groove 7.

8 designates a cracking plunger extending longitudinally of the machine and slidably mounted at its forward end in a bearing arm 9. At the rear end of the cracking plunger 8 is a head block 10 provided with a roller 11 (Figs. I, II and XI) which lies in the cam groove 7 to provide for a forward and backward movement of the head block 10 and cracking plunger 8 during each revolution of the cam wheel 6. The cracking plunger and head block are guided and prevented from rotating by means of a guide rod 12 carried by the head block and slidably fitted to a bearing 13, as shown in Fig. II. The cracking plunger 8 is coöperable with an alining companion plunger which is adjusted automatically to an operative position so as to compensate for variations in the lengths of the nuts, as will be hereinafter described.

14 designates a pocket wheel located adjacent to the forward end of the cracking plunger 8 and provided with a series of peripheral pockets adapted to receive the nuts. The pocket wheel is rotatably supported by a shaft 15 mounted in the bearing 9 and provided at its rear end with a bevel gear wheel 16 (Figs. I and II) which meshes with a bevel gear wheel 17 carried by a shaft 18, the latter being rotatably mounted in a bearing 18'. 19 designates a notched wheel fixed to the shaft 18 and located immediately in front of the constantly rotating main shaft 4. The main shaft is provided with a tappet wheel 20 having a roller 21 adapted to enter the notches in the notched wheel 19 for the purpose of imparting a step by step movement to said notched wheel in response to the continuous rotary movements of the main shaft 4. Movement is transmitted from the notched wheel 19 through shaft 18, bevel gears 17 and 16, and shaft 15 to the pocket wheel 14, the latter being advanced step by step in such a manner that upon each complete revolution of the main shaft said pocket wheel 14 will advance one step, thus removing the cracked nut and locating another nut in alinement with the cracking plungers. To insure an accurate step by step movement, the shaft 15 is provided with a notched detent wheel 22 that is engaged by spring pressed detent 23.

B designates a cracking plunger alined with the cracking plunger 8 and slidably fitted to bearings 24 and 25. After a nut has been positioned between the cracking plungers 8 and B the plunger 8 is advanced a fixed distance to the position shown in Figs. I, II and VI. The cracking plunger B then advances toward the plunger 8 until the nut is firmly held between the adjacent ends of the plungers, and thereafter the cracking plunger 8 advances a predetermined distance to impart a predetermined "cracking" movement to the nut. The last mentioned movement takes place when the offset portion 7' of the cam 7 engages the roller 11.

The means for actuating the cracking plunger B preferably includes a toothed wheel 27 meshing with rack teeth 28 on the rear portion of said cracking plunger, said toothed wheel 27 being fixed to the rock shaft 29 mounted in bearings 30, as shown in Fig. II. A sprocket wheel 31 (Figs. II and X) is fixed to the rock shaft 29. 32 designates a sprocket chain secured at one end to the sprocket wheel 31 and having its opposite end connected to a tension spring 33 (Fig. X). This spring, pulling the sprocket chain 32, tends to turn the sprocket wheel 31, shaft 29 and toothed wheel 27 in a clockwise direction, thereby tending to move the cracking plunger B toward the plunger 8.

A restoring cam 34, fixed to the constantly rotating main shaft 4 (Figs. II and X) is adapted to engage a roller 35 at the upper end of an arm 36. This arm is pivotally supported at 37 and connected by means of a bar 38 to a crank pin 39 on the sprocket wheel 31. When the cracking plunger B is in one of its variable operative positions, the parts just described occupy the positions shown in Figs. II and X, the roller 35 being separated from the cam 34. After the nut has been cracked, the constantly rotating cam 34 engages the roller 35 and movement is transmitted through the connecting bar 38 to the sprocket wheel 31, thus turning said sprocket wheel in the direction indicated by the arrow in Fig. X. The shaft 29 turns with the sprocket wheel 31 and the toothed wheel 27 on said shaft turns in the direction indicated by the arrow in Fig. VI, thus restoring the cracking plunger B to its normal or inoperative position. Thereafter, the pocket wheel 14 advances one step to carry the cracked nut away from the cracking plungers and to locate another nut in alinement with said plungers, as previously described. The cracking plunger 8 is then advanced by means of the cam 6 to the position shown in Fig. I, and while said plunger 8 occupies this position, the cracking plunger B is advanced until it is stopped by engaging the nut. The plunger B may be moved to the last mentioned position by means of the spring 33 which tends to turn the shaft 29 and toothed wheel 27 as previously pointed out, or if desired the parts may be so timed that such movement will be imparted to said cracking plunger by the compensating elements which will be presently described.

The compensating device for insuring a predetermined "cracking" movement irrespective of the length of the nut to be cracked, preferably includes a series of compensating elements in the form of vertically movable wedges 40, 41, 42 and 43 located in front of the inclined face 44 at the front end of the cracking plunger B and adapted to engage said inclined face to retain said cracking plunger in any one of its variable operative positions. The compensating wedges are slidably fitted to a guide member 45 at the front of the machine and they are free to move independently of each other, so that any one of them may be selected automatically and adjusted to a position wherein it will retain the cracking plunger B in engagement with the nut during the cracking operation. The different compensating wedges may occupy a normal or starting position wherein they are all supported by a restoring bar 46, as shown in Fig. IX, and they may occupy the positions shown in Fig. VI wherein one of the wedges engages the cracking plunger B to prevent the latter from moving in response to the thrust which is delivered to said cracking plunger during the cracking operation.

The restoring bar 46 is connected, by means of vertical rods 47, to a pair of arms 48, said arms being fixed to a rock shaft 49 mounted in bearings 50. An operating arm 51, secured to and depending from the rock shaft 49, is connected by means of a long bar 52 to the arm 53, as shown in Figs. II and VIII. The arm 53 is pivotally supported at 54 (Fig. VIII) and provided at its upper end with a roller 55 which engages a cam 56, said cam being fixed to the constantly rotating main shaft 4. A spring 57, connected to the arm 53 (Fig. VIII) retains the roller 55 in engagement with the cam 56. It will be apparent that the restoring bar 46 is raised and lowered intermittently through the medium of the constantly rotating cam 56.

When the parts are so timed that the cracking plunger B will be forced into engagement with the nut through the medium of the spring actuated toothed wheel 27 and rack 28, the restoring bar 46 is lowered after the cracking plunger B moves toward the nut. It will be noted that the compensating wedges 40, 41, 42 and 43 are different from each other, the narrowest wedge being designated 40 and the widest being designated 43. When the restoring bar 46 moves downwardly from the position shown in Fig. IX one or more of the compensating wedges will drop by gravity to allow one of the wedges to travel to an operative position wherein it is stopped by engaging the inclined face 44 on the cracking plunger B while said plunger is firmly engaged with the nut. The narrowest wedge always moves downwardly by gravity in response to a downward movement of the restoring bar 46, but one or more of the wider wedges may be stopped by engaging the top face of the cracking plunger B, as shown in Fig. VI, each of the wedges 41, 42 and 43 being provided with a shoulder 60 adapted to engage plunger B when the restoring bar 46 occupies its lowermost position. In other words, the restoring bar 46 constitutes a support for all of the wedges when they occupy their normal or starting positions, and after the restoring bar moves downwardly some of the wedges may be supported by the cracking plunger B. In cracking extra long nuts, the narrowest wedge 40 will move downwardly until it is stopped by engaging the inclined face 44 on the cracking plunger B, while the remaining wedges will be retained in an elevated position, but in cracking the shortest nuts all of the wedges will move downwardly and the wide wedge 43 will finally stop in an operative position wherein it engages the inclined face 44 on the cracking plunger B.

After the nut has been cracked the restoring bar 46 is elevated to restore all of the wedges to their normal or starting position (Fig. IX) and the cracking plunger B is then restored by means of the spring actuated toothed wheel 27 and rack 28.

61 designates a main nut receptacle provided with a discharge opening near its lower end as shown in Fig. III, and 62 designates an auxiliary receptacle adapted to receive the nuts which pass through said discharge opening. The means for feeding the nuts one at a time from the auxiliary receptacle 62 to the nut cracking device includes a rotary nut carrier E arranged to travel in the receptacle 62 so as to pick up and remove the nuts one at a time as will be hereinafter described. The nuts taken from the receptacle 62 are dropped through a discharge opening 63 (Fig. III) and permitted to move by gravity through a chute 64 and into a slightly inclined runway 65 below the lower end of said chute. A follower 66 movable along the top face of the runway 65 (Figs. III and V) is adapted to push each nut upwardly along the runway and into one of the pockets of the pocket wheel 14, as indicated by arrows in Fig. III. The object in pushing the nuts along the upwardly inclined runway 65 before delivering them to the pocket wheel 14 is to adjust each nut to the predetermined position before delivering it to the pocket wheel. The nuts are free to turn on the runway 65 and while they are loosely supported on said runway they engage the abutment face 66' at one end of the follower 66 so that each nut will be automatically adjusted to a position wherein it lies transversely of the runway before being discharged therefrom, and when the nut is finally delivered to the cracking device it will be alined with the cracking plungers.

The means for reciprocating the follower 66 includes a slide 67 mounted in a guideway, as shown in Figs. III and IV and to which the follower is connected by an arm 68. A constantly rotating crank wheel 69 is connected to the slide 67 by a connecting rod 70. The crank wheel 69 is fixed to a shaft 71 provided with a gear wheel 72 (Figs. II and VII) which meshes with a pinion 73, said pinion being fixed to a shaft 74 provided with a bevel gear 75 meshing with a larger bevel gear 76 on the main shaft 4.

The nut carrier E, located in the nut receptacle 62, rotates continuously and it is provided with a series of pick-up arms 77 each of which is provided with a nut receiving pocket 78 adapted to travel in a circular path adjacent to the inclined wall 79 of the nut receptacle 62. The arms 77 are adjustably secured to the center hub or spider 80 by means of set screws, as shown in Fig. III, said hub or spider being fixed to a constantly rotating shaft 81 the axis of which is at an angle to a vertical line, the receptacle wall 79 being at an angle to the horizontal line so that the excess nuts picked up by the nut holder 78 will be permitted to drop by gravity before reaching the discharge opening 63, as will be presently described. The nut holders 78 travel downwardly at one side of the receptacle 62 and pass through the contents of said receptacle, thereafter moving upwardly with the result of lifting one or more of the nuts. In traveling upwardly to the discharge opening 63, the nut holders 78 tilt from one position to another so as to permit the excess nuts to drop by gravity instead of being carried to the discharge opening, the tilting movement being due to the fact that the nut holders travel in an arcuate path instead of in a straight line. A careful observation of the structure shown most clearly in Figs. III and IV will show that each nut holder will pass from the nuts in a tilted position so that some of the excess nuts may drop by gravity from one side of the nut holder, and after reaching an elevated position near the discharge opening 63, it will be tilted in the opposite direction so that excess nuts may drop by gravity from the opposite side of the nut holder. A deflector 83 is arranged below the discharge opening 63 to prevent the selected nuts from dropping into the receptacle 62 when they leave the nut holders at said discharge opening.

The inclined shaft 81 is driven through the medium of a bevel gear wheel 84 fixed to the lower end of said shaft (Figs. II and III), said bevel gear wheel 84 being in mesh with a pinion 85 fixed to a shaft 86 provided with a bevel gear wheel 87 which meshes with a pinion 88 on the constantly rotating drive shaft 4. 89 designates a stationary ejector rod fixed to the bearing 9 (Fig. II) and extending through a slot in the cracking plunger 8 to a point near the adjacent end of said plunger. When this cracking plunger is retracted, the stationary ejector rod 89 serves as an abutment for preventing the cracked nut from following said plunger.

I claim :—

1. In a nut cracking machine, cracking members adapted to engage the nuts, and a selective compensating device including a plurality of compensating elements adapted to hold one of said cracking members to the nut to be cracked, said compensating elements being of different widths and movable independently of each other so that any one of them may be selected and automatically located in an operative position.

2. In a nut cracking machine, a cracking member, and a compensating device including independently movable wedges for holding said cracking member to the nut to be cracked.

3. In a nut cracking machine, cracking members adapted to engage the nuts, and a selective compensating device including a plurality of compensating wedges of different widths adapted to hold one of said cracking members to the nut to be cracked, said compensating wedges being movable independently of each other so that any one of the different wedges may be selected automatically and located in an operative position.

4. In a nut cracking machine, cracking members adapted to engage the nuts, and a selective compensating device including a plurality of compensating wedges of different widths adapted to hold one of said cracking members to the nut to be cracked, said compensating wedges being of different widths, and means for supporting said compensating wedges in their normal or starting positions, the different compensating wedges being movable independently of each other in response to movements of said means so that any one of the different wedges may be selected and stopped automatically when it reaches an operative position.

5. In a nut cracking machine, a cracking plunger, and a compensating device including independently movable wedges adapted to retain said cracking plunger in different operative positions, said wedges being different from each other, a support for holding said wedges in their normal or starting positions, means for actuating said support to permit the wedges to drop by gravity, and restraining means associated with said wedges and cracking member to retain the widest wedge in an ineffective position after the wedges have been released from said support.

6. In a nut cracking machine, cracking members adapted to engage the nuts, and a selective compensating device including a plurality of compensating elements adapted to hold one of said cracking members to the nut to be cracked, said compensating elements being of different widths and movable independently of each other so that any one of them may be selected and automatically located in an operative position, and a yielding device tending to move the cracking member to be held by said compensating device to its operative position.

7. In a nut cracking machine, a cracking plunger provided with rack teeth, an oscillatory member meshing with said rack teeth, a yieldable device tending to actuate said oscillatory member to move said cracking plunger to its operative position, a series of wedges adapted to engage said plunger to retain it in its different operative positions, said wedges being different from each other, a support for holding said wedges in their normal or starting positions, and means for releasing said wedges to allow them to move independently until one of the wedges reaches an operative position.

HENRY D. CRAWFORD.

Copies of this patent may be obtained for five cents each, by addressing the "Commissioner of Patents, Washington, D. C."